Figure 1:
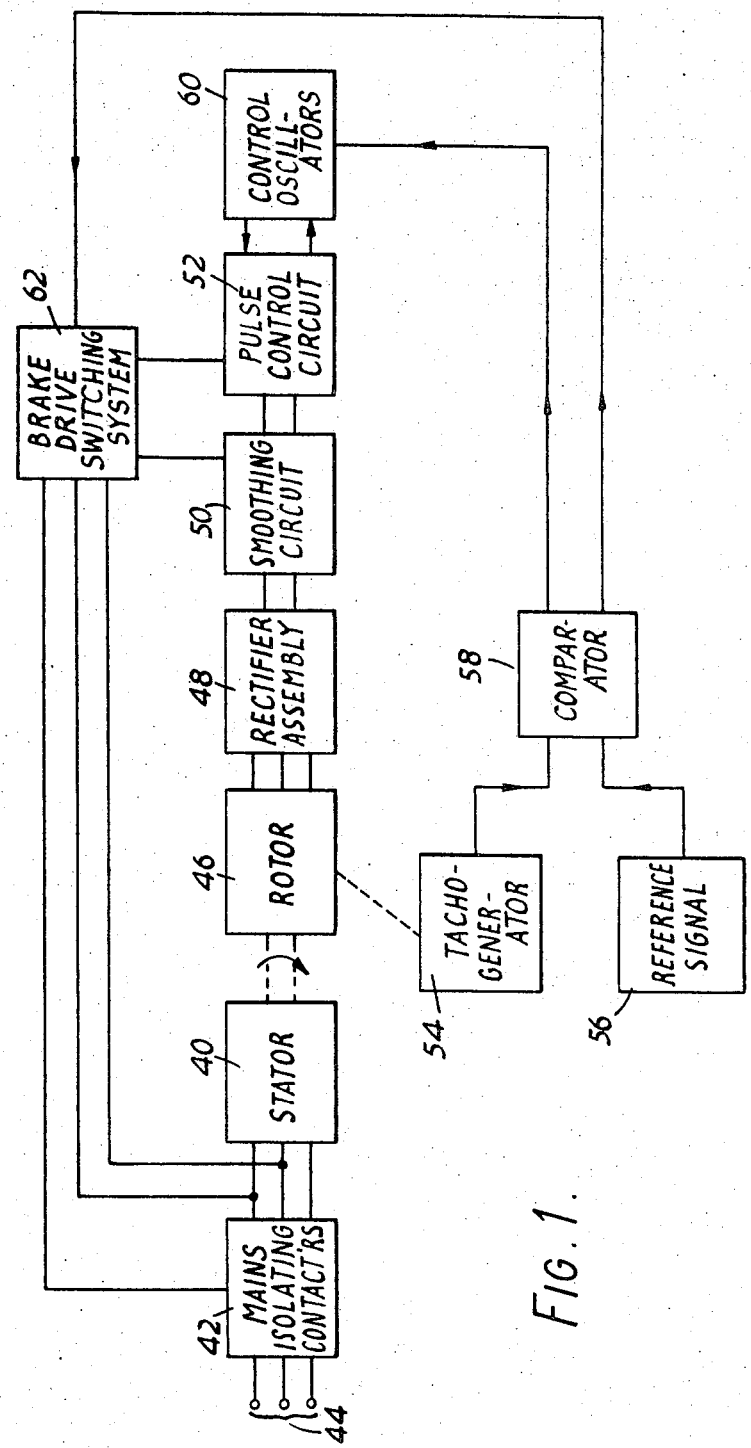

United States Patent
Sloan et al.

[15] 3,699,416
[45] Oct. 17, 1972

[54] DYNAMIC BRAKING OF WOUND MOTOR POLYPHASE INDUCTION MOTORS

[72] Inventors: Albert Everett Sloan; Alistair Gordon Turnbull, both of Gateshead, England

[73] Assignee: Sevcon Engineering Limited, Gateshead, Co. Durham, England

[22] Filed: July 2, 1971

[21] Appl. No.: 159,348

[30] Foreign Application Priority Data

| | | |
|---|---|---|
| May 7, 1971 | Canada | 112415 |
| Dec. 3, 1970 | Italy | 32591/70 |
| Dec. 3, 1970 | Switzerland | 17902/70 |
| Dec. 4, 1970 | Japan | 45/106892 |
| Dec. 4, 1970 | Germany | P 20 59 842.9 |
| Dec. 4, 1970 | France | 7043758 |
| Dec. 3, 1970 | Sweden | 1640270 |

[52] U.S. Cl. .......................... 318/211, 318/237
[51] Int. Cl. ................................ H02p 3/22
[58] Field of Search .............. 318/209–212, 237

[56] References Cited

UNITED STATES PATENTS

| | | |
|---|---|---|
| 3,504,254 | 3/1970 | Rosenberry, Jr. .......318/237 X |
| 3,519,912 | 7/1970 | Charlwood et al. .......318/237 |
| 3,529,224 | 9/1970 | Bedford ....................318/237 |
| 3,546,550 | 12/1970 | Badal et al. ...............318/212 |

Primary Examiner—Gene Z. Rubinson
Attorney—Rosen & Steinhilper

[57] ABSTRACT

A circuit for effecting dynamic braking of a wound rotor polyphase induction motor comprises rectifier means for rectifying the output of the rotor and switch means which disconnect the stator from the mains supply and connect the rectified rotor output through a d.c. chopper to one or more phase windings of the stator to effect dynamic braking of the motor. The level of direct current in the stator phase windings, and hence the degree of braking, is controlled by the d.c. chopper, which may also be employed to control the driving speed of the motor.

16 Claims, 5 Drawing Figures

ALBERT E. SLOAN
ALISTAIR G. TURNBULL, Inventors

ROSEN & STEINHILPER, Attorneys

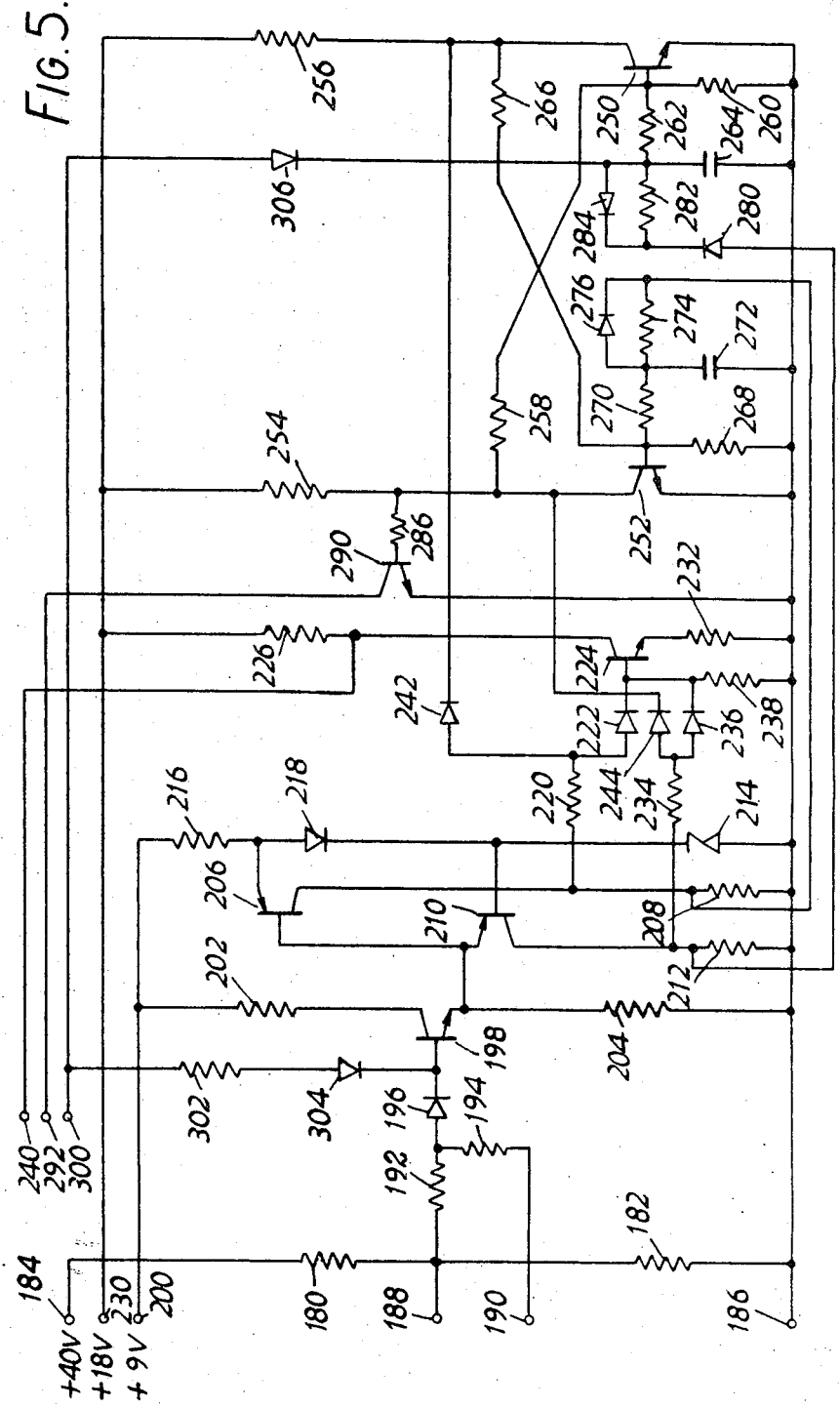

DYNAMIC BRAKING OF WOUND MOTOR POLYPHASE INDUCTION MOTORS

This invention relates to dynamic braking of wound rotor polyphase induction motors.

According to the present invention there is provided a circuit for effecting dynamic braking of a wound rotor polyphase induction motor having phase windings fed from a polyphase mains supply and a wound rotor, comprising rectifier means adapted to be connected to the rotor so as to rectify the output of the rotor, and switch means adapted in one condition thereof to disconnect the stator phase windings from the mains supply and to connect the rectifier means to a variable mark-space ratio pulse controller and to at least one phase winding of the stator so that the rectified rotor output is supplied through the pulse controller to the stator phase winding thereby to effect dynamic braking of the motor, the pulse controller being adapted to control the level of direct current in the stator phase winding.

Preferably, the switch means are adapted in a second condition thereof to connect the stator phase windings to the mains supply and to connect the rectifier means to the pulse controller so that the rectified rotor output is supplied to the pulse controller, the pulse controller being adapted to afford variation of the effective resistance of the rotor thereby to vary the driving speed of the motor.

Suitably, there is provided a smoothing circuit connected to the rectifier means so as to smooth the rectified rotor output and including a reservoir capacitor so connected to the switch means that on operation of the switch means to effect dynamic braking of the motor the reservoir capacitor begins to discharge through a series path including at least one of the phase windings of the stator thereby to establish an initial direct current in the stator phase winding or windings.

Advantageously, the smoothing circuit includes a first unidirectional current path through which, in operation, the reservoir capacitor receives charging current from the rectifier means when the pulse controller is non-conducting, and a second unidirectional current path connected in a series path including the reservoir capacitor and the pulse controller and through which, in use, the reservoir capacitor tends to discharge when the pulse controller is conducting, the said current paths being connected to the switch means in such a manner that, during dynamic braking of the rotor, both the charging and discharging currents of the reservoir capacitor flow in the same direction through the stator phase winding or windings.

Suitably, there are provided sensing means for providing a first electrical signal dependent on the speed of the rotor, means for providing a second or reference signal, comparator means for comparing the magnitudes of the first and second signals and for providing an output signal dependent on the magnitudes of the first and second signals, the said output signal being supplied to the switch means to cause the switch means to enter its said first condition thereby to effect dynamic braking of the rotor when the comparison of the first and second signals indicates that the motor speed is greater than a predetermined value corresponding to the magnitude of the second or reference signal.

Figure 2:
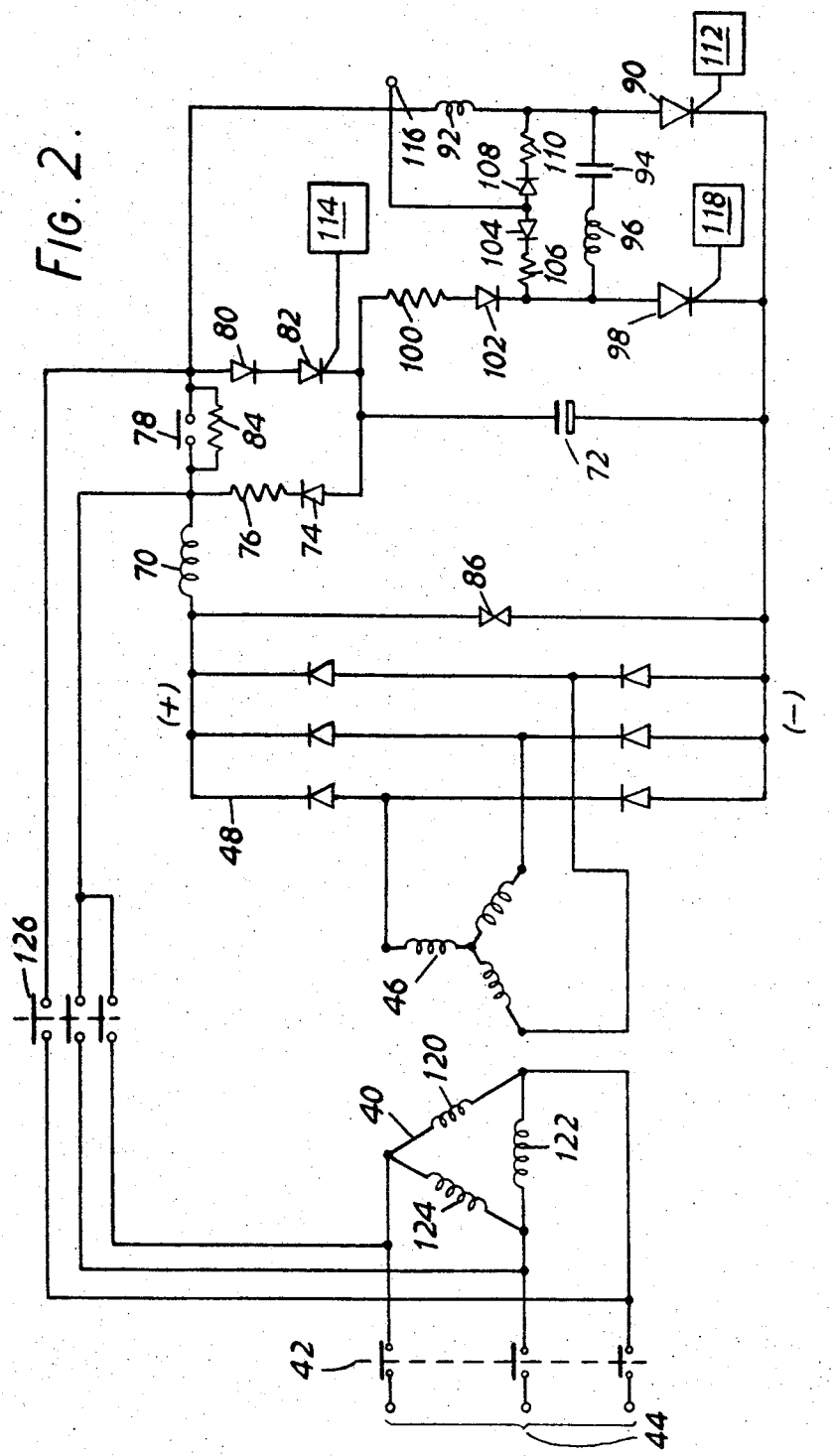
Figure 3:
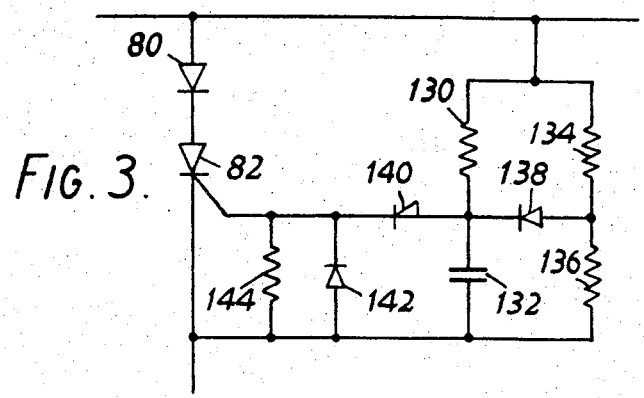
Figure 4:
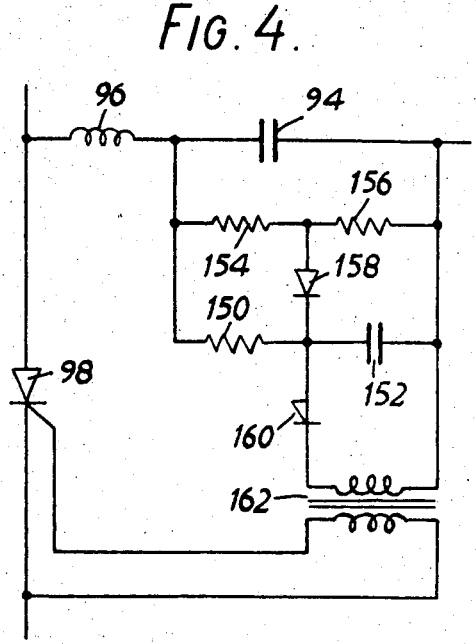

The invention will now be described, by way of example, with reference to the accompanying drawings in which:

FIG. 1 is a block diagram of a control system according to this invention, as applied to a three-phase, wound rotor induction motor, FIG. 2 is a circuit diagram of some of the elements of the control system shown in FIG. 1, FIGS. 3 and 4 are more detailed diagrams of parts of the circuit of FIG. 2, and FIG. 5 is a circuit diagram of further elements of the control system shown in FIG. 1.

As shown in FIG. 1, the delta-connected phase windings of the stator 40 of a three phase, wound rotor type of induction motor are connected to the mains supply 44 via mains isolating contactors 42. The wound rotor 46 of the motor has its phase windings star connected and across the output of the rotor via the appropriate slip rings is a full wave rectifier bridge 48 which provide a rectified output. Connected across the rectified output via a smoothing circuit 50 is a variable mark-space ratio pulse controller 52 which operates, as explained in more detail below, to vary the effective resistance of the rotor 46 when the motor is in a driving mode, thereby to vary the speed of the motor, and also operates to control the current supplied to the stator 40 from the rotor 46 when the motor is in a braking mode as described more fully below.

The speed of rotation of the rotor 46 is measured by a tacho-generator 54, which provides an electrical signal proportional to the rotor speed. The signal from the tacho-generator 54 is compared with a reference signal 56 by means of a comparator 58. If the comparison indicates that the speed of the motor is too low, a signal supplied by the comparator 58 to the control oscillators 60 governing the pulse controller 52 causes the pulse controller to decrease the effective rotor resistance and thereby effect an increase in the motor speed. If the comparison indicates that the speed of the motor is too high, a signal from the comparator 58 to the brake/drive switching system 62 causes the system to operate the mains isolating contactors 42 to disconnect the stator 40 from the mains supply 42, and operates further contactors to connect the rectified output of the rotor 44, through the pulse controller 52, to two of the phase windings of the stator 40 to effect dynamic braking of the motor. The current fed to the stator, and hence the dynamic braking is controlled through the pulse controller 52, as described more fully below, in dependence upon the signal received from the comparator 58.

The stator 40, rotor 46, rectifier assembly 48, smoothing circuit 50, and pulse controller 52 are shown in more detail in FIG. 2.

As shown in FIG. 2, the output of the full-wave rectifier 48 is applied to a smoothing circuit comprising an inductor 70 and a reservoir capacitor 72. One plate of the reservoir capacitor 72 is connected to the negative terminal of the rectifier 48 whilst its other plate is connected through the series connection of a diode 74, resistor 76 and the inductor 70 to the positive terminal of the rectifier 48, the diode 74 being connected in a direction opposing the voltage of the rectified rotor output. In parallel with the diode 74 and resistor 76 is the series connection of a contactor 78, a diode 80 and a thyristor 82, the direction of conduction of the diode 80 and thyristor 82 being opposed to that of the diode 74. A resistor 84 is connected across the terminals of the contactor 78. A controlled selenium rectifier or "clipcell" 86 is connected across the rectifier assembly 48 to protect the diodes of the assembly from damage due to high voltage transients.

Connected to the smoothing circuit is the variable mark-space ratio pulse controller 52, comprising a main thyristor 90 whose anode is connected, through an inductor 92, to the junction of the contactor 78 and diode 80, and whose cathode is connected to the negative terminal of the rectifier assembly 48, A commutating capacitor 94, inductor 96 and second thyristor 98 are connected in series across the main thyristor 90. A conducting path consisting of a resistor 100 and diode 102 is connected between the junction of the thyristor 82 and reservoir capacitor 72 and the junction of the second thyristor 98 and inductor 96, the cathode of diode 102 being connected to the anode of thyristor 98. An auxiliary supply is provided by connections from a regulated 160 volt supply 116, derived in a suitable manner from the mains, through a diode 104 and resistor 106 to the anode of thyristor 98 and through a diode 108 and resistor 110 to the anode of thyristor 90.

The gate cathode of the main thyristor 90 is supplied with firing pulses from a control oscillator 112 of well-known form. The control oscillator comprises a relaxation oscillator the period of oscillation of which is governed by a transistor the base of which is applied a signal derived from the comparator 58, which is described more fully below. The oscillator may for example be of the kind shown in British Pat. 950,734, or U.S. Pat. No. 3,222,582 the above-mentioned transistor taking the place of the variable resistor controlling the period of the oscillator. Control oscillators of this kind are also illustrated in British Pat. No. 963,648 or U.S. Pat. No. 3,337,786.

The gate cathode of the second thyristor 98 is connected to a firing circuit 118, described more fully below, which supplies a firing pulse to the thyristor 98 when the voltage across the commutating capacitor 94 reaches 200 volts. Thyristor 82 receives firing pulses from a firing circuit 114, described more fully below, the thyristor being fired into conduction when the voltage across diode 80 and thyristor 82 reaches 150 volts.

The junction of two of the phase windings 120 and 122 of the stator is connected through one pair of contacts of a contactor 126 to the junction of the contactor 78 and diode 80. The other two junctions of the phase windings of the stator are connected through contacts of the contactor 126 to the junction of the contactor 78 and the resistor 76.

The firing circuit 114 associated with thyristor 82 is shown more fully in FIG. 3. Connected across the diode 80 and thyristor 82 is a resistor-capacitor network comprising a resistor 130 and a capacitor 132 in series, one plate of the capacitor being connected to the cathode of thyristor 82. A pair of resistors 134 and 136 are connected in parallel with the resistor 130 and capacitor 132, and a diode 138 connects the junction of resistors 134 and 136 to the junction of the resistor 130 and capacitor 132. The junction of capacitor 132 and resistor 130 is connected through a Shockley diode 140 to the gate cathode of thyristor 82. The breakover voltage of Shockley diode 140 is such that a firing pulse is supplied to the thyristor 82 through the Shockley diode when the voltage across the capacitor 132 reaches 10 volts. The values of resistance of the resistors 134 and 136 are chosen so that capacitor 132 is charged rapidly to 10 volts through diode 138 when the voltage across the diode 80 and thyristor 82 reaches 150 volts. If the voltage across diode 80 and thyristor 82 is between 10 volts and 150 volts, the capacitor 132 will charge through diode 138 to the voltage required to cause breakover of the Shockley diode 140 at a rate dependent on the voltage across diode 80 and thyristor 82. A maximum delay between the commutation of main thyristor 90 and the firing of thyristor 82 is provided by resistor 130, through which, in the limit as the voltage across diode 80 and thyristor 82 approaches 10 volt, capacitor 132 will charge to the required value after a delay of about twenty milliseconds. A diode 142 is connected between the cathode and the gate cathode of thyristor 82 to prevent any reverse voltage being applied to the gate cathode, and a gate suppression resistor 144 is connected in parallel with diode 142.

The firing circuit 118 associated with thyristor 98 is shown more clearly in FIG. 4. A resistor-capacitor network comprising a resistor 150 and capacitor 152 is connected across the commutating capacitor 94, one plate of the capacitor 152 being connected to the plate of the commutating capacitor 94 which is connected to the anode of the main thyristor 90. A pair of resistors 154 and 156 are connected in parallel with the resistor 150 and capacitor 152, and a diode 158 connects the junction of resistors 154 and 156 to the junction of resistor 150 and capacitor 152. The junction of capacitor 152 and resistor 150 is connected through a Shockley diode 160 to one end of the primary winding of a transformer 162, the other end of the primary winding being connected to the junction of capacitor 152 and resistor 156. The secondary winding of transformer 162 is connected across the cathode-gate cathode path of thyristor 98. The values of resistance of the resistors 154 and 156 are chosen so that capacitor 152 is charged rapidly to 10 volts through diode 158 when the voltage across the commutating capacitor 94 reaches 200 volts. When the voltage across capacitor 152 reaches 10 volts, Shockley diode 160 breaks over and a firing pulse is applied to thyristor 98 through transformer 162. If the voltage across the commutating capacitor 94 is between 10 and 200 volts, the capacitor 152 will charge through diode 158 to the voltage required to cause breakover of the Shockley diode 160 at a rate dependent on the voltage across the commutating capacitor. A maximum delay for firing thyristor 98 is provided by resistor 150 through which capacitor 152 will charge to the requisite voltage, when the voltage across the commutating capacitor is about 10 volts, after a delay of about 20 milliseconds.

The comparator 58 and associated circuitry are shown more fully in FIG. 5.

The reference signal 56 is provided by a voltage divider consisting of two resistors 180 and 182 connected between a stabilized 40 volt voltage rail 184 and a zero voltage rail 186. The output of the tacho-generator 54 is rectified by means of a full-wave rectifier (not shown) and applied to terminals 188 and 190, across which is connected a voltage divider comprising a pair of resistors 192 and 194. Terminal 188 is connected also to the junction of resistors 180 and 182, so that the potential at the junction of resistors 192 and 194 is equal to the difference between the reference voltage at the junction of resistors 180 and 182 and a fixed fraction of the rectified output voltage of the tachogenerator 54.

The junction of resistors 192 and 194 is connected through a diode 196 to the base of an n-p-n transistor 198, the collector of which is connected through a resistor 202 to a stabilized 9 volt voltage rail 200 and the emitter of which is connected through a resistor 204 to the zero voltage rail 186. The emitter of transistor 198 is connected also to the base of an p-n-p transistor 206, the collector of which is connected through a resistor 208 to the zero voltage rail, and to the emitter of a p-n-p transistor 210, the collector of which is connected through a resistor 212 to the zero voltage rail 186. The base of transistor 210 is held at 4.7 volts by means of a zener diode 214 which is connected in series with a resistor 216 and diode 218 between the 9 volt rail 200 and the zero voltage rail 186. The emitter of transistor 206 is connected to the junction of the resistor 216 and the anode of diode 218. The emitter of transistor 206 is thus held at a potential equal to 4.7 volts plus the voltage drop across diode 218. The collector of transistor 206 is connected through a resistor 220 and diode 222 to the base of an n-p-n transistor 224. The collector of transistor 224 is connected through a resistor 226 to a stabilized 18 volt voltage rail 230, and its emitter is connected through a resistor 232 to the zero voltage rail. The collector of transistor 210 is similarly connected through a resistor 234 and diode 236 to the base of transistor 224. The junction of the base of transistor 224 with the cathodes of diodes 222 and 236 is connected through a resistor 238 to the zero voltage rail. The collector of transistor 224 is connected through line 240 to the control oscillator 112 of the main thyristor 90 and supplies a control voltage to control the frequency of firing of the main thyristor.

The junction of resistor 220 and diode 222 is connected through a diode 242 to the collector of an n-p-n transistor 250 of a bistable multivibrator forming part of the brake-drive switching system 62. The junction of resistor 234 and diode 236 is similarly connected through a diode 244 to a second n-p-n transistor 252 of the bistable multivibrator. The bistable multivibrator is of a well-known form, and consists of the two n-p-n transistors 250 and 252, the emitters of which are connected to the zero voltage rail 186 and the collectors of which are connected through respective resistors 254 and 256 to the 18 volt rail 230. The base of transistor 250 is connected to the collector of transistor 252 through resistor 258, to the zero voltage rail through resistor 260, and through a resistor 262 to one plate of a capacitor 264, the other plate of which is connected to the rail 186. The base of transistor 252 is similarly connected through a resistor 266 to the collector of transistor 250, to the rail 186 through resistor 268, and through a resistor 270 to one plate of a capacitor 272, the other plate of which is connected to the rail 186.

The collector of transistor 210 is connected through a resistor 274 to the junction of capacitor 272 and resistor 270, a diode 276 being connected across the resistor 274 with its anode connected to the capacitor 272. Similarly, the collector of transistor 210 is connected through diode 280 and resistor 282 to the junction of capacitor 264 and resistor 262, a diode 284 being connected across resistor 282 with its anode connected to capacitor 264.

The junction of the collector of transistor 252 and resistor 254 of the bistable multivibrator is connected through a resistor 286 to the base of an n-p-n transistor 290, the emitter of which is connected to the zero voltage rail 186. The collector of transistor 290 is connected through line 292 to a relay (not shown) which is energized, when transistor 290 is in a conducting state, to close the mains isolating contactors 42 (see FIG. 2) and to open contactors 126 and 78 to put the motor in a driving condition. When transistor 290 is in a non-conducting state the relay is de-energized, and the contactors 42, 126 and 78 are operated to put the motor in a braking condition, as explained below.

A line 300, which can be connected when desired to the 9 volt rail 200, is connected through resistor 302 and diode 304 to the base of transistor 198, and also through a diode 306 to the junction of capacitor 264 and resistor 262 of the bistable multivibrator.

The various stabilized voltage rails are derived from suitable circuits fed from the mains supply through a full-wave rectifier.

The operation of the various circuits will now be described.

Referring to FIG. 2, when the motor is in its driving mode, the mains isolating contactors 42 are closed to connect the stator 40 of the motor to the three phase mains supply 44. Braking contactors 126 are open, and contactor 78 is closed to connect the main thyristor 90 in series with the rectifier assembly 48. The rotating magnetic field developed in the stator induces currents in the phase windings of the rotor 46, and causes the rotor to rotate. The output of the rotor is rectified by the rectifier assembly 48 and applied across the main thyristor 90. The smoothing circuit 50 prevents high inductive voltages appearing on the rotor on turn off of the main thyristor 90. Thus when the main thyristor 90 is rendered non-conducting, and thyristor 82 is conducting, charging current flows into the reservoir capacitor 72 through inductor 70, contactor 78, diode 80 and thyristor 82. When the main thyristor 90 is rendered conducting, the capacitor begins to discharge through diode 74, resistor 76, contactor 78 and thyristor 90. The resistor 84 across contactor 78 permits charging of capacitor 72 before contactor 78 is closed, to prevent high transient currents when the contactor is closed.

The pulse control circuit operates as follow. Assuming that thyristors 98 and 82 are non-conducting, the main thyristor is rendered conducting by a firing pulse from its firing circuit 112. Rotor current therefore flows through thyristor 90, and reservoir capacitor 72 beings to discharge. Current from reservoir capacitor 72 flows also through resistor 100, diode 102, and inductor 96 to the commutating capacitor 94, which is therefore charged with the plate connected to inductor 96 at a positive potential relative to the anode of thyristor 90.

When the voltage across the commutating capacitor 94 reaches 200 volts, or after a maximum delay of twenty milliseconds as described above, thyristor 98 is rendered conducting by firing circuit 118. The commutating capacitor 94 begins to discharge through inductor 96 and thyristor 98, so that the main thyristor 90 is reverse biased and is therefore commutated. Capacitor 94 continues to discharge through the inductive circuit comprising inductor 96, thyristor 98, rectifier assembly 48, inductor 70 and contactor 72, and begins to recharge with opposite polarity. Since thyristor 82 is initially non-conducting, the rotor current cannot flow into the reservoir capacitor 72, so that rotor current flows into the commutating capacitor to enhance the charge on it. Thyristor 82 is fired into conduction by firing circuit 114, as described above, when the voltage across the diode 80 and thyristor 82 reaches 150 volts. This ensures that the voltage to which the commutating capacitor 94 is charged exceeds the voltage across the reservoir capacitor 72. When thyristor 82 is rendered conducting, the plate of the commutating capacitor 94 connected to the anode of thyristor 90 is at approximately the same potential as the plate of the reservoir capacitor 72 which is connected to the cathode of thyristor 82. The other plate of the commutating capacitor 94 is therefore at a lower potential than the plate of the reservoir capacitor 72 connected to the cathode of thyristor 98. Thus when the current flowing through inductor 96 is dissipated, thyristor 98 is reverse biased and is therefore commutated. When the main thyristor 90 is again rendered conducting, thyristor 82 is reverse biassed and therefore commutated by the reservoir capacitor 72 which begins to discharge through the main thyristor 90. The cycle then repeats itself.

It will be appreciated that the provision of thyristor 82 in the charging path of the reservoir capacitor 72 enables the commutating capacitor 94 to be charged to a voltage in excess of that to which it would be charged if thyristor 82 were omitted or replaced by a diode, to ensure commutation of thyristor 98. If thyristor 98 were not commutated, the resistor 100 would be effectively placed across the rectified rotor output when the main thyristor was non-conducting, instead of the desired open circuit.

Similarly, firing thyristor 98 when the voltage across the commutating capacitor 94 reaches a predetermined value ensures that the capacitor 94 attains a charge sufficient to commutate the main thyristor 90.

The auxiliary supply through line 116 acts to provide a sufficient voltage across each of the thyristors 90 and 98 to maintain the operation of the pulse controller when the output voltage of the rectifier assembly 48 is very low.

The provision of a diode 80 and thyristor 82 in series, rather than a single thyristor, enables a thyristor of relatively low voltage rating to be used, the combination being less costly than a single thyristor with the necessary voltage rating.

It will be apparent that, with the motor in its driving mode, the pulse control operates to vary the effective resistance of the rotor. Thus when the main thyristor 90 is non-conducting the rotor resistance is infinite and when the main thyristor 90 is conducting the rotor resistance is effectively zero. Accordingly by varying the rate at which the main thyristor 90 is alternately fired into conduction and commutated, the effective resistance of the rotor, and therefore the speed of the rotor for any given driving torque, is varied. When the pulse control is acting as a variable resistor in this manner, energy is dissipated by current flowing through resistors 76 and 100.

When dynamic braking of the motor is to be effected, the mains isolating contactors 42 are opened to disconnect the phase windings of the stator 40 from the mains supply. Contactor 78 is then opened and breaking contactors 126 are closed. The effect of this is to connect phase windings 120 and 122 of the stator in parallel and to connect the rectifier assembly 48 in series with the phase windings 120 and 122, and the main thyristor 90. Phase winding 124 of the stator is short-circuited through contactors 126. Moreover, the reservoir capacitor 72 is connected, through diode 74 and resistor 76 in a series circuit with phase windings 120 and 122 of the stator and the main thyristor 90. Thus, when thyristor 90 is rendered conducting, the reservoir capacitor 72 begins to discharge through the phase windings 120 and 122. The d.c. current which thus flows in the stator windings establishes a static flux which is cut by the rotating conductors of the rotor thereby causing a braking torque to be applied to the rotor, and inducing current in the phase windings of the rotor. The induced current is rectified by rectifier assembly 48 and flows through the stator windings in the series circuit described above, so that the stator current and therefore the braking torque is increased. The system is therefore a positive feedback system providing dynamic braking of the motor.

It will be evident that the d.c. current in the phase windings 120 and 122 of the stator 40 can be controlled by varying the mark-space ratio of the pulse control. Thus when the duration of conduction in a fixed time interval of the main thyristor 90 is a maximum, the braking torque builds up most quickly, and as the duration of conduction in a fixed time interval of the main thyristor 90 decreases so does the rate of increase of the braking torque.

The smoothing circuit operates in a similar manner during braking to that of its operation when the motor is in its driving mode. Thus when the main thyristor 90 is commutated, the reservoir capacitor 72 begins to charge through inductor 70, phase windings 120 and 122 of the stator, diode 80 and thyristor 82. When the main thyristor 90 is fired into conduction, the reservoir capacitor 72 begins to discharge through the series path consisting of diode 74, resistor 76, phase windings 120 and 122 of the stator, and the main thyristor 90. It will be seen that both the charging and discharging currents of the reservoir capacitor flow in the same direction through the stator windings. Thus, in effect, part of the rectified rotor current is passed twice through the stator windings, so that the static flux established in the stator is thereby enhanced.

The operation of the comparator and associated circuitry shown in FIG. 5 will now be described.

A voltage signal derived from the reference voltage and tachogenerator-output is applied to the base of transistor 198 as described above. Transistor 198 is connected in an emitter follower configuration so that the voltage signal is applied through its emitter to the base of transistor 206 and to the emitter of transistor 210. If the potential of the emitter of transistor 198 is slightly above 4.7 volts, both transistors 206 and 210 are held in a non-conducting condition, and the circuit is in a quiescent state.

If the output voltage of the tachogenerator 54 increases, indicating that the rotor speed is too high, the potential of the emitter of transistor 198 falls below 4.7 volts. Transistor 210 remains non-conducting, so that its collector is held at the potential of the zero voltage line 186. Transistor 206 is rendered conducting, so that current flows through resistor 208 and the collector voltage of transistor 206 rises towards 4.7 volts. Collector current flows from transistor 206 through resistor 274 and charges capacitor 272 of the bistable multivibrator. When capacitor 272 is charged, current flows through resistor 270 to the base of transistor 252 of the multivibrator, turning it on. The potential of the collector of transistor 252 therefore falls, as does the potential of the base of transistor 250, so that transistor 250 is turned off. When transistor 252 is thus turned on, the potential of the base of transistor 290 falls and this transistor is therefore rendered non-conducting. The relay (not shown) associated with transistor 290 is de-energized, and the contactors 42, 126 and 78 are released to put the motor in its braking mode.

When transistor 250 has been turned off, collector current from transistor 206 flows also through resistor 220 and diode 222 to the base of transistor 224, which is therefore rendered conducting. Collector current therefore flows through resistor 226, and the collector voltage of transistor 224 falls. This voltage, supplied through line 240 to the control oscillator 112 of the main thyristor 90 effects an increase in the frequency of firing of the thyristor 90, so that dynamic braking of the motor is effected until the speed of the motor returns to the speed set by the reference voltage. It will be apparent that when transistor 250 is conducting, the anode 222 is held at substantially zero potential, through diode 242, so that collector current from transistor 206 cannot be supplied to the base of transistor 224. Thus the increase in mark-space ratio of the pulse controller cannot be increased until the multivibrator has been actuated to select the braking mode of the motor.

If the speed of the motor falls, so that the potential of the emitter of transistor 198 rises above a potential 4.7 volts plus the voltage drop across diode 218, transistor 210 is rendered conducting, whilst transistor 206 is turned off, its collector voltage falling to zero. Capacitor 272 of the multivibrator therefore discharges through diode 276, whilst capacitor 264 is fed with charging current from the collector of transistor 210. Transistor 250 is therefore turned on, and transistor 252 is turned off. The potential of the base of transistor 296 rises towards the 18 volt line 230, and this transistor is turned on. The relay operating the mains isolating and braking contactors is therefore energized, and the motor is switched to its driving mode. When transistor 252 is rendered non-conducting, the voltage at the anodes of diodes 236 and 244 is allowed to rise, and collector current is supplied through diode 236 to the base of transistor 224, turning it on. Thus the mark-space ratio of the pulse control is increased, and the speed of the motor increases until it reaches its set speed.

It will be evident that the described circuit acts, when the speed of the motor departs from its set speed, to switch the motor to its driving or braking mode as appropriate and then operates the pulse control to bring the speed of the motor back to its set speed.

The circuit also allows a maximum speed to the motor to be selected. To effect this, line 300 is connected to the 9 volt rail. A 9 volt potential is therefore applied through resistor 302 and diode 304 to the base of transistor 198, over-riding the tachogenerator control and holding transistor 224 conducting to obtain the maximum mark-space ratio for the pulse control. At the same time, capacitor 264 of the multivibrator is charged rapidly through diode 306, ensuring that the multivibrator is set to select the driving mode for the motor.

It will be apparent that an adjustable reference voltage, and therefore an adjustable predetermined speed of the motor could be obtained by replacing the resistor network 180 and 182 with an adjustable potentiometer.

We claim:

1. A circuit for effecting dynamic braking of a wound rotor polyphase induction motor having stator phase windings fed from a polyphase mains supply and a wound rotor, comprising rectifier means connected to the rotor so as to rectify the output of the rotor, a variable mark-space ratio pulse controller, switch means comprising first switching contactor means connected between the polyphase mains supply and the stator phase windings of the motor and operable in a first condition of the switch means to disconnect the stator phase windings from the mains supply, second switching contactor means connected between the rectifier means and the pulse controller and third switching contactor means connected between said pulse controller and said stator phase windings, said second and third contactor means being operable in said first condition of the switch means to connect the output of said rectifier means through said pulse controller to said stator phase windings, thereby to effect dynamic braking of the motor, the pulse controller being operable to control the level of direct current in said stator phase windings during such braking.

2. A circuit as claimed in claim 1, wherein in a second condition of the switch means the first contactor means are operable to connect said stator phase windings to said mains supply and the second contactor means are operable to connect said pulse controller across said rectified rotor output, whereby the pulse controller varies the rotor current and hence the effective resistance of the rotor thereby to vary the driving speed of the motor.

3. A circuit as claimed in claim 2, wherein there is provided a smoothing circuit connected to the rectifier means so as to smooth the rectified rotor output and comprising a reservoir capacitor which, when the switch means is in its first condition, is connected in a series path including said pulse controller and at least one of said stator phase windings, whereby, on operation of the switch means from its second to its first condition, the reservoir capacitor begins to discharge through said stator phase winding or windings thereby to establish an initial direct current through said stator phase winding or windings.

4. A circuit as claimed in claim 3, in which the smoothing circuit includes a first unidirectional current path connected across the rectifier means and the reservoir capacitor receives charging current from the rectifier means when the pulse controller is non-conducting, and a second unidirectional current path connected in a series path including the reservoir capacitor and the pulse controller and through which the reservoir capacitor tends to discharge when the pulse controller is conducting, the said current paths being connected to the switch means in such a manner that, during dynamic braking of the rotor, both the charging and discharging currents of the reservoir capacitor flow in the same direction through the stator phase winding or windings.

5. A circuit as claimed in claim 4, in which the pulse controller comprises a main thyristor connected to the rectifier means in parallel with the reservoir capacitor and said first and second unidirectional current paths, a commutating capacitor connected, in series with an inductor and a second thyristor, across the main thyristor, and means for charging the commutating capacitor in such a direction that on firing the second thyristor into conduction the commutating capacitor reverse biases and so commutates the main thyristor, the commutating capacitor then being charged in the reverse direction from the rectified rotor output through the series path including the inductor and second thyristor and when fully charged reverse biasing the second thyristor to commutate it, and in which the first unidirectional current path of the smoothing circuit includes a semiconductor switching device adapted to be rendered conducting when the reverse charge on the commutating capacitor has reached a predetermined value sufficient to ensure that the second thyristor is commutated when the commutating capacitor is fully charged.

6. A circuit as claimed in claim 1 and adapted for use with a three-phase induction motor the stator phase windings of which are delta-connected, in which the switch means are adapted to connect two of the stator phase windings in parallel to the rectified rotor output and to short circuit the remaining phase winding.

7. A circuit as claimed in claim 1 in which there are provided sensing means for providing a first electrical signal dependent on the speed of the rotor, means for providing a first electrical signal dependent on the speed of the rotor, means for providing a second or reference signal, comparator means for comparing the magnitudes of the first and second signals and for providing an output signal dependent on the magnitudes of the first and second signals, the said output signal being supplied to the switch means to cause the switch means to enter its said first condition thereby to effect dynamic braking of the rotor when the comparison of the first and second signals indicates that the motor speed is greater than a predetermined value corresponding to the magnitude of the second or reference signal.

8. A circuit as claimed in claim 7, in which the comparator means is connected to the variable mark-space ratio pulse controller so as to vary, when the switch means is in its first condition, the mark-space ratio of the pulse controller in dependence on the magnitude of the output signal of the comparator means thereby to control the level of direct current in the stator phase winding.

9. A circuit as claimed in claim 8, in which the switch means are adapted in a second condition thereof to connect the stator phase windings to the mains supply and to connect the rectifier means to the pulse controller so that the rectified rotor output is supplied to the pulse controller, the pulse controller being adapted to afford variation of the effective resistance of the rotor thereby to vary the driving speed of the motor, and in which the comparator means are connected to the pulse controller so as to vary, when the switch means is in its second condition, the mark-space ratio of the pulse controller in dependence on the output signal of the comparator means thereby to control the driving speed of the motor.

10. A circuit as claimed in claim 7, in which manually operated control means are provided for varying the second or reference signal thereby to vary the said predetermined speed of the motor.

11. A control circuit for speed control of polyphase wound rotor induction motors comprising rectifier means for rectifying the electrical output of the rotor, sensing means for providing a first electrical signal dependent upon the velocity of the rotor, means for providing a second or reference signal, comparator means for comparing and providing an output signal dependent on the magnitudes of the first and second signals, a variable mark-space ratio pulse controller connected to the rectifier means and adapted upon variation of the mark space ratio thereof to vary the resistance of the rotor circuit, means for connecting the comparator output to the pulse controller thereby to vary the mark-space ratio of the pulse controller and switching means actuated, when the difference between the first and second signal is in a reverse sense with respect to that which causes the rotor to drive, to connect the rectified rotor output to the stator and disconnect the stator from the electrical supply thereby to effect dynamic braking of the rotor.

12. Control apparatus for controlling the speed of a wound rotor polyphase induction motor, comprising means for rectifying the output of the rotor, a variable mark-space ratio pulse controller comprising a main thyristor connected across the rectified rotor output, a commutating capacitor connected, in series with an inductor and a second thyristor, across the main thyristor, and means for charging the commutating capacitor from the rectified rotor output in such a direction that on firing the second thyristor into conduction the commutating capacitor reverse biases and so commutates the main thyristor, the commutating capacitor then being charged in the reverse direction through the inductive series path including the rectified rotor output and the second thyristor and when fully charged reverse biasing the second thyristor to commutate it, the apparatus further including a smoothing circuit comprising a reservoir capacitor arranged to receive charging current from the rectified rotor output through a first unidirectional current path when the main thyristor is commutated and to discharge through a second unidirectional current path and the main thyristor when the main thyristor is rendered conducting, the first unidirectional current path including a semiconductor switching device, and firing means operable to render conducting the semiconductor switching device when the charge on the commutating capacitor in the said reverse direction has reached a predetermined value sufficient to ensure that the second thyristor is commutated when the commutating capacitor is fully charged.

13. Control apparatus as claimed in claim 12, wherein the semiconductor switching device is a thyristor.

14. Control apparatus as claimed in claim 12, wherein the means for charging the commutating capacitor from the rectified rotor output comprises a unidirectional current path connecting the junction of the reservoir capacitor and the said first and second unidirectional current paths of the smoothing circuit to the series circuit including the commutating capacitor, inductor and second thyristor.

15. Control apparatus as claimed in claim 12, wherein the firing means for the semiconductor switching device is operable to render conducting said switching device a predetermined time after the main thyristor is commutated if the reverse charge on the commutating capacitor has not reached said predetermined value within said predetermined time.

16. Control apparatus as claimed in claim 12, wherein there is provided a firing circuit for said second thyristor, said firing circuit being connected to the commutating capacitor and operable to supply a firing pulse to said second thyristor to render it conducting when the forward charge on said commutating capacitor reaches a predetermined value.

* * * * *